(12) United States Patent
Takahashi

(10) Patent No.: US 10,138,998 B2
(45) Date of Patent: Nov. 27, 2018

(54) VEHICLE CONTROL DEVICE

(71) Applicant: NISSAN MOTOR CO., LTD., Kanagawa (JP)

(72) Inventor: Eiji Takahashi, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 113 days.

(21) Appl. No.: 15/510,475

(22) PCT Filed: Sep. 11, 2014

(86) PCT No.: PCT/JP2014/074046
§ 371 (c)(1),
(2) Date: Mar. 10, 2017

(87) PCT Pub. No.: WO2016/038715
PCT Pub. Date: Mar. 17, 2016

(65) Prior Publication Data
US 2017/0284542 A1 Oct. 5, 2017

(51) Int. Cl.
*B60W 10/04* (2006.01)
*F16H 61/14* (2006.01)
*B60W 10/10* (2012.01)
*B60W 10/02* (2006.01)
*B60W 10/06* (2006.01)
(Continued)

(52) U.S. Cl.
CPC ......... *F16H 61/143* (2013.01); *B60W 10/026* (2013.01); *B60W 10/04* (2013.01); *B60W 10/06* (2013.01); *B60W 10/10* (2013.01); *B60W 30/18* (2013.01); *B60W 30/1882* (2013.01); *F02D 15/00* (2013.01); *B60W 2510/0638* (2013.01); *B60W 2710/024* (2013.01)

(58) Field of Classification Search
None
See application file for complete search history.

(56) References Cited

U.S. PATENT DOCUMENTS 8,600,632 B2 * 12/2013 Nagai ................. B60W 10/026
123/311
8,651,071 B2 * 2/2014 Kamada .................. F02D 15/00
123/48 B
2012/0035816 A1 2/2012 Nagai

FOREIGN PATENT DOCUMENTS

JP     H08-85371 A     4/1996
JP     2010-025080 A     2/2010
(Continued)

*Primary Examiner* — Dirk Wright
(74) *Attorney, Agent, or Firm* — Osha Liang LLP

(57) ABSTRACT

A control device for a vehicle including a variable compression ratio mechanism arranged to vary an engine compression ratio of an internal combustion engine, and a torque converter which includes a lock-up mechanism, and which is disposed between the internal combustion engine and a transmission, has a controller configured to switch the engine compression ratio from a high compression ratio to a low compression ratio, and to switch the lock-up mechanism from a lock-up OFF state to a lock-up ON state. When the controller is switching the engine compression ratio from the high compression ratio to the low compression ratio, the controller starts switching the lock-up mechanism to the lock-up ON state when a current engine compression ratio is equal to or smaller than a permissible compression ratio which is between the high compression ratio and the low compression ratio.

7 Claims, 7 Drawing Sheets

(51) Int. Cl.
   *B60W 30/18* (2012.01)
   *B60W 30/188* (2012.01)
   *F02D 15/00* (2006.01)

(56) References Cited

FOREIGN PATENT DOCUMENTS

| | | |
|---|---|---|
| JP | 2011-236803 A | 11/2011 |
| JP | 5146598 B2 | 2/2013 |
| WO | 2011/121711 A1 | 10/2011 |

* cited by examiner

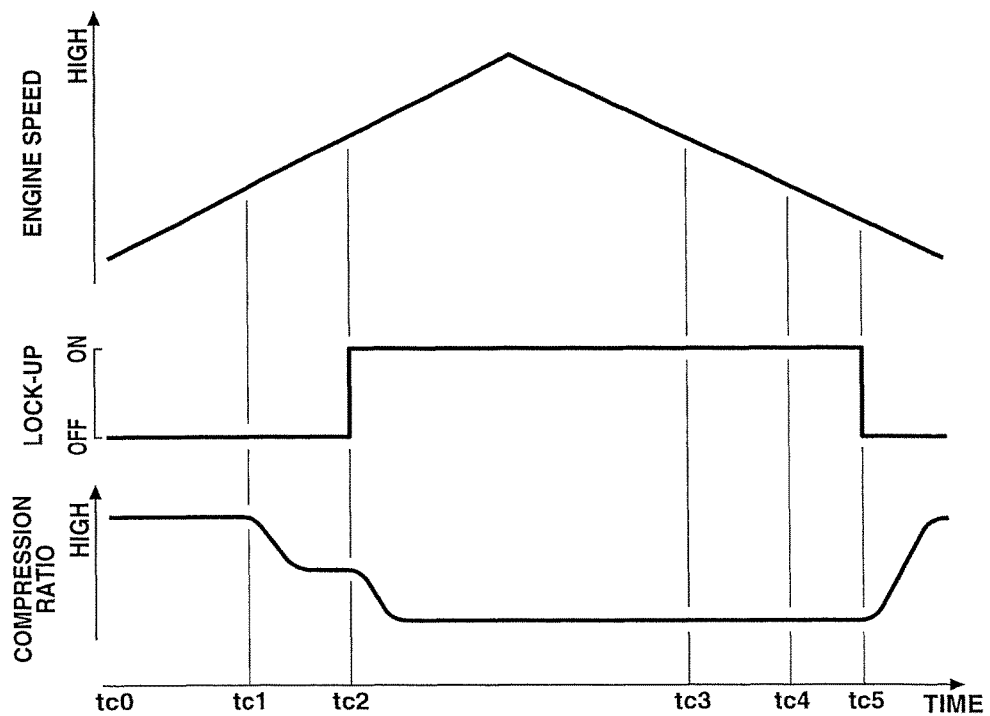
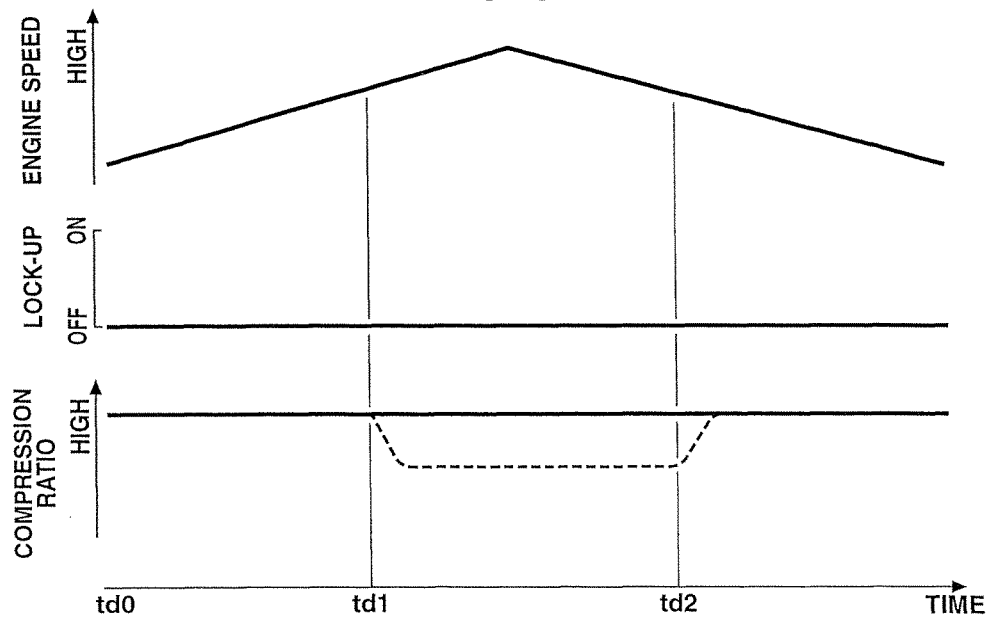

VEHICLE CONTROL DEVICE

BACKGROUND

Technical Field

This invention relates to a control device for a vehicle including a torque converter including a lock-up mechanism, and a variable compression ratio mechanism arranged to vary a compression ratio.

Related Art

For example, a patent document 1 discloses an art configured to decrease a compression ratio at an engagement of a lock-up clutch in a driving region in which the lock-up clutch is engaged in cooperation with the compression ratio to bring the lock-up mechanism to a lock-up ON state, and thereby to effectively use effect of the compression ratio variation to improve fuel economy of the vehicle.

However, in general, a response at the engagement of the lock-up clutch is better than a response of the variable compression ratio mechanism at the variation of the compression ratio. Moreover, the torque variation of the internal combustion engine during one cycle becomes greater as the compression ratio becomes higher. That is, in the patent document 1, the lock-up clutch is engaged before the compression ratio becomes low. Accordingly, the large vehicle vibration may be generated due to the torque variation of the internal combustion engine.

Patent Document 1: Japanese Patent No. 5146598

SUMMARY

A control device for a vehicle according to one or more embodiments of the present invention, including a variable compression ratio mechanism arranged to vary a compression ratio of an internal combustion engine, and a torque converter which includes a lock-up mechanism, and which is disposed between the internal combustion engine and a transmission, the control device comprises: when the control device switches the compression ratio from a high compression ratio to a low compression ratio, and switches the lock-up mechanism from a lock-up OFF state to a lock-up ON state, the control device being configured to switch the lock-up mechanism to the lock-up ON state after the compression ratio is shifted to a low compression ratio side.

With this, the lock-up mechanism of the torque converter is not in the lock-up ON state in the high compression ratio state. Accordingly, it is possible to suppress the generation of the vehicle vibration (booming noise).

Furthermore, it is possible to decrease the step (level difference) of the compression ratio when the lock-up mechanism is shifted from the lock-up OFF state to the lock-up ON state, and thereby to decrease the vehicle vibration (the booming noise) due to the response delay of the compression ratio.

BRIEF DESCRIPTION OF DRAWINGS

FIG. 8 is a timing chart showing one example of a driving state in one or more embodiments of present invention.

FIG. 9 is a timing chart showing one example of a driving state in one or more embodiments of present invention.

DETAILED DESCRIPTION

Hereinafter, embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
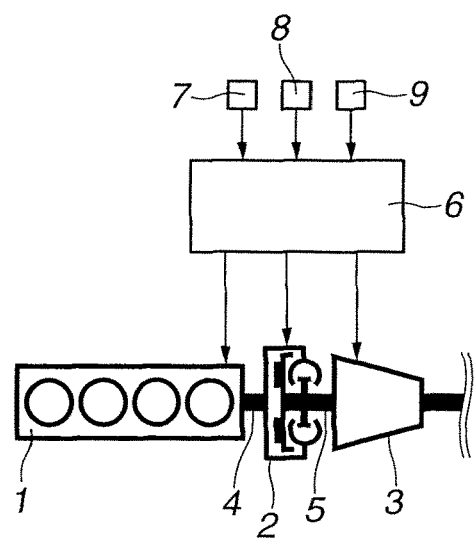
FIG. 1 is an explanation view schematically showing a system configuration of a control device for a vehicle according to one or more embodiments of the present invention.

FIG. 1 is an explanation view schematically showing a system configuration of a control device for a vehicle according to one or more embodiments of the present invention.

An internal combustion engine 1 mounted on a vehicle (not shown) is connected through a torque converter 2 including a lock-up mechanism to an automatic transmission 3. The torque converter 2 is connected to an output shaft 4 of the internal combustion engine 1. The automatic transmission 3 is connected to an output shaft 5 of the torque converter 2.

The internal combustion engine 1, the torque converter 2, and the automatic transmission 3 are controlled based on a command (signal) from a control unit 6.

For example, the internal combustion engine 1 is controlled by the control unit 6 to obtain an appropriate engine torque in accordance with a driving state of the vehicle. The lock-up mechanism of the torque converter 2 is controlled by the control unit 6 to be switched between a lock-up ON state in which a lock-up clutch (not shown) is brought to an engagement state to bring the internal combustion engine 1 and the automatic transmission 3 to a direct connection state, and a lock-up OFF state in which the lock-up clutch is brought to a disengagement state, in accordance with a driving state of the vehicle. The automatic transmission 3 is controlled by the control unit 6 to obtain an appropriate shift stage in accordance with the driving state of the vehicle.

The control unit 6 receives signals from various sensors such as an accelerator opening degree sensor 7 arranged to sense an opening degree (depression amount) of an accelerator pedal operated by a driver, and a crank angle sensor 8 arranged to sense an engine speed, and a crank angle of a crank shaft 15 described later. It is possible to sense an engine load of the internal combustion engine 1 from the opening degree of the accelerator pedal.

Moreover, the control unit 6 is configured to estimate a time period (congestion road traveling estimation time period described later) after which the vehicle can pass through a traffic congestion (traffic jam) when the vehicle travels on the traffic congestion road, for example, based on information from a car navigation system 9 mounted on the vehicle. That is, the control unit 6 includes a high compression ratio lock-up OFF driving time period estimating section configured to estimate a driving continuation time period at the high compression ratio in the lock-up OFF state.

Besides, the control unit 6 is configured to judge whether the state of the lock-up mechanism is the lock-up ON state or the lock-up OFF state, by a signal input from the torque converter 2.

Figure 2:
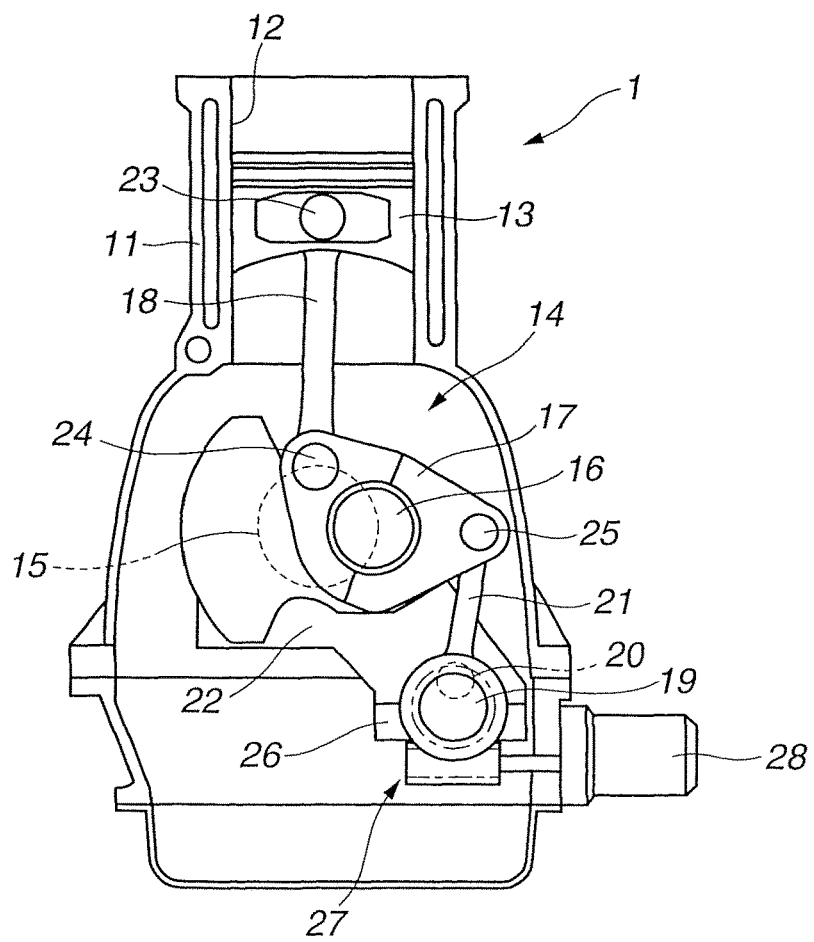
FIG. 2 is an explanation view schematically showing a schematic configuration of an internal combustion engine.

FIG. 2 is an explanation view schematically showing a schematic configuration of the internal combustion engine 1 described above. This internal combustion engine 1 includes a variable compression ratio mechanism 14 arranged to vary an upper dead center position of a piston 13 arranged to be reciprocated within a cylinder 12 of a cylinder block 11, and thereby to vary the engine compression ratio.

The variable compression ratio mechanism 14 is a multi-link type piston-crank mechanism in which the piston 13 and a crank pin 16 of the crank shaft 15 are linked by a plurality of links. The variable compression ratio mechanism 14 includes a lower link 17 rotatably mounted on the crank pin 16; an upper link 18 connecting this lower link 17 and the piston 13; a control shaft 19 including an eccentric shaft portion 20; and a control link 21 connecting the eccentric shaft portion 20 and the lower link 17.

The crank shaft 15 is rotatably supported on the cylinder block 11 by a crank bearing bracket 22.

The upper link 18 includes one end rotatably mounted to a piston pin 23, and the other end rotatably connected to the lower link 17 by a first link pin 24. The control link 21 includes one end rotatably connected to the lower link 17 by a second link pin 25, and the other end rotatably mounted to the eccentric shaft portion 20 of the control shaft 19.

The control shaft 19 is disposed in parallel to the crank shaft 15. The control shaft 19 is rotatably supported on the cylinder block 11. That is, the control shaft 19 is rotatably supported between the crank bearing bracket 22 and a control bearing bracket 26.

The control shaft 19 is driven and rotated through a gear mechanism 27 by an actuator 28 which is an electric motor so that a rotation position of the control shaft 19 is controlled. The actuator 28 is controlled based on a command from the control unit 6. Besides, the control shaft 19 may be driven and rotated by a hydraulic actuator.

By varying the rotation position of the control shaft 19 by the actuator 28, a position of the eccentric shaft portion 20 which is a swing fulcrum of the control link 21 is varied. With this, a posture of the lower link 17 by the control link 21 is varied, so that a piston motion (stroke characteristics) of the piston 13, that is, the upper dead center position and the lower dead center position of the piston 13 are varied. With this, the compression ratio is continuously varied.

In a low load region of the internal combustion engine 1, it is possible to improve a thermal efficiency by controlling the compression ratio to a high value, and thereby to decrease a fuel consumption amount. Moreover, in a high load region of the internal combustion engine 1, a knocking is easy to be generated. Accordingly, the compression ratio is controlled to a low value.

When the lock-up mechanism of the torque converter 2 is in the lock-up ON state, booming noise (muffled sound) is generated within a vehicle interior by vibration due to a torque variation of the internal combustion engine 1. This booming noise becomes larger as the torque variation during one cycle of the internal combustion engine 1 becomes larger. Moreover, the torque variation during one cycle of the internal combustion engine 1 becomes larger as the compression ratio of the internal combustion engine 1 becomes larger.

Accordingly, in a case where the lock-up mechanism of the torque converter 2 is in the lock-up ON state when the compression ratio of the internal combustion engine 1 is high, the large booming noise may be generated within the vehicle interior.

Furthermore, a response of the lock-up mechanism of the torque converter 2 at the switching is higher than a response of the variable compression ratio mechanism 14 when the compression ratio is varied.

Accordingly, the compression ratio varying control of the internal combustion engine 1 is performed in cooperation with the lock-up mechanism switching control of the torque converter 2, that is, the switching control between the lock-up OFF state and the lock-up ON state. With this, it is possible to effectively suppress the generation of the booming noise (the vehicle vibration). That is, when the compression ratio is switched from the high compression ratio to the low compression ratio, and when the lock-up mechanism of the torque converter 2 is switched from the lock-up OFF state to the lock-up ON state, the lock-up mechanism is switched to the lock-up ON state after the compression ratio is shifted to the low compression ratio side.

With this, the lock-up mechanism of the torque converter 2 is not in the lock-up ON state in the high compression ratio state. Accordingly, it is possible to suppress the generation of the vehicle vibration (the booming noise). Moreover, a step (level difference) of the compression ratio when the lock-up mechanism is switched from the lock-up OFF state to the lock-up ON state becomes small. Consequently, it is possible to decrease the vehicle vibration (booming noise) at the switching due to the response delay of the compression ratio.

In one or more embodiments of the present invention, in consideration of the response delay of the compression ratio in the compression ratio varying control, the switching from the lock-up OFF state to the lock-up ON state is postponed (suspended) until the compression ratio becomes equal to or smaller than a predetermined permissible compression ratio even when the driving state is varied from a predetermined lock-up OFF region to a predetermined lock-up ON region.

In this case, the permissible compression ratio may be set to a lower value as the engine load becomes higher.

The vehicle vibration (the booming noise) becomes larger as the load state becomes higher. Accordingly, the permissible compression ratio is set to the smaller value as the engine load becomes higher. With this, it is possible to effectively suppress the generation of the vehicle vibration (the booming noise).

Moreover, the permissible compression ratio is set to the higher value as the engine speed becomes higher.

The frequency is deviated from a frequency region in which the vehicle vibration (the booming noise) is generated as the engine speed becomes higher. Accordingly, the permissible compression ratio is set to the higher value as the engine speed becomes higher. With this, it is possible to suppress the generation of the vehicle vibration (the booming noise), and to be brought to the lock-up ON state at an early timing. Consequently, it is possible to relatively improve the fuel consumption.

Figure 3:
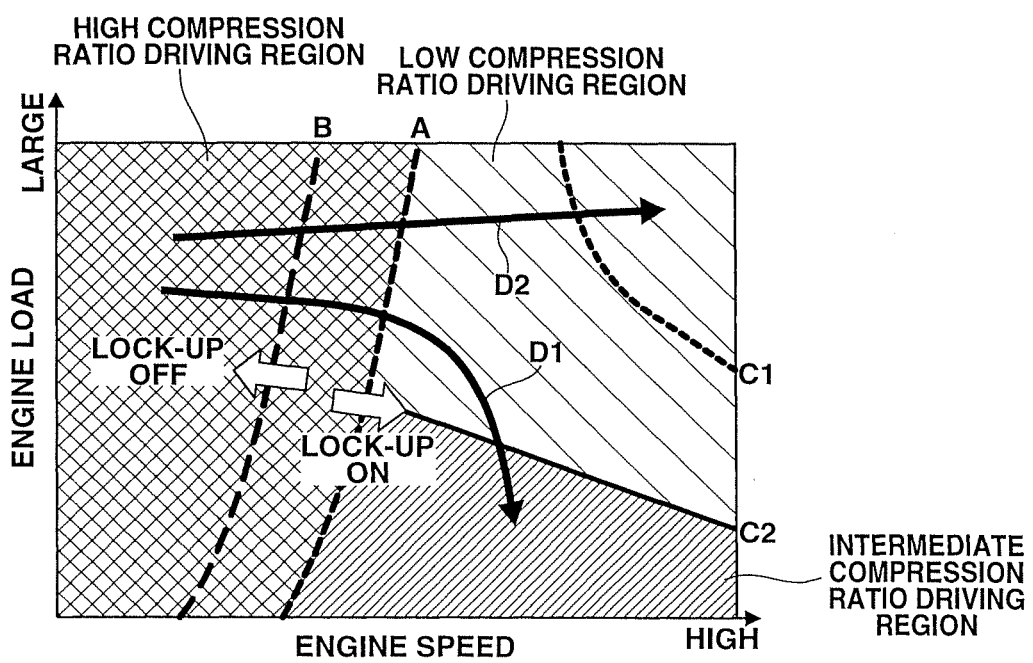
FIG. 3 is an explanation view schematically showing a setting region of a compression ratio, and a state of a lock-up mechanism in one or more embodiments of present invention.

FIG. 3 is an explanation view schematically showing a setting region of the compression ratio and the state of the lock-up mechanism of the torque converter 2 in one or more embodiments of the present invention.

A characteristic line A shown by a broken line in FIG. 3 is a lock-up ON line. As shown by an arrow in FIG. 3, when the driving state is varied in FIG. 3 from a left side region of the characteristic line A to a right side region of the characteristic line A, the lock-up mechanism of the torque converter 2 is switched from the lock-up OFF state to the lock-up ON state. That is, the high speed side of the characteristic line A, that is, the right side region of the characteristic line A in FIG. 3 is a lock-up ON region in which the lock-up mechanism of the torque converter 2 is brought to the lock-up ON state. The low speed side of the characteristic line A, that is, the left side region of the characteristic line A in FIG. 3 is the lock-up OFF region in which the lock-up mechanism of the torque converter 2 is brought to the lock-up OFF state. A case where the driving state is varied from the left side region of the characteristic line A to the right side region of the characteristic line A in FIG. 3 is, for example, a case where the only engine load is lowered, a case where the engine load is suddenly lowered, and the engine speed is lowered by a small amount, a case where the engine load is lowered by a small amount, and the engine speed is suddenly increased, and other cases. Besides, in a case where the compression ratio is not equal to or smaller than the permissible compression ratio, the lock-up OFF state is maintained even when the driving state is in the lock-up ON region.

A characteristic line B shown by a broken line in FIG. 3 is the lock-up OFF line which is positioned on the low speed side of the characteristic line A. When the lock-up mechanism of the torque converter 2 is in the lock-up ON state, the lock-up mechanism is switched to the lock-up OFF state when the driving state is varied in FIG. 3 from the right side region of the characteristic line B to the left side region of the characteristic line B, as shown by an arrow in FIG. 3. That is, the lock-up ON state is maintained in the region which is sandwiched by the characteristic line A and the characteristic line B in FIG. 3. That is, the region which is sandwiched by the characteristic line A and the characteristic line B in FIG. 3 is a hysteresis at the switching of the lock-up mechanism of the torque converter 2.

A characteristic line C1 shown by a broken line in FIG. 3 is a forcible lock-up ON line. When the driving state enters the high speed high load side of this characteristic line C1, that is, when the driving state enters the right side region of the characteristic line C1 in FIG. 3, the lock-up mechanism of the torque converter 2 is forcibly switched from the lock-up OFF state to the lock-up ON state even when the compression ratio is not varied to be equal to or smaller than the permissible compression ratio due to the response delay.

In the high load high speed state of the internal combustion engine 1, it is difficult to be switched from the lock-up OFF state to the lock-up ON state. Accordingly, when the driving state of the internal combustion engine 1 enters a region on the high speed high load side of the characteristic line C1 which is the high load high speed region, the lock-up mechanism is immediately started to be switched from the lock-up OFF state to the lock-up ON state. With this, it is possible to readily switch from the lock-up OFF state to the lock-up ON state, and to protect the lock-up mechanism of the torque converter 2.

Besides, when the driving state of the internal combustion engine 1 becomes the predetermined high load region or the predetermined high speed region, the lock-up mechanism may be started to be switched from the lock-up OFF state to the lock-up ON state without waiting for the shift to the low compression ratio side (before the compression ratio is shifted to the low compression ratio side).

In FIG. 3, the low speed side of the characteristic line A, that is, the left side region of the characteristic line A is a high compression ratio driving region in which the compression ratio of the internal combustion engine 1 is set to the predetermined high compression ratio.

In FIG. 3, the high speed side of the characteristic line A, that is, the right side region of the characteristic line A is divided to upper and lower sections by a characteristic line C2 shown by a solid line in FIG. 3. The high load side region which is the upper side of the characteristic line C2 in FIG. 3 is a low compression ratio driving region in which the compression ratio of the internal combustion engine 1 is set to the predetermined low compression ratio. The low load side region which is the lower side of the characteristic line C2 in FIG. 3 is an intermediate compression ratio driving region in which the compression ratio of the internal combustion engine 1 is set to a predetermined intermediate compression ratio that is smaller than the predetermined high compression ratio, and greater than the predetermined low compression ratio.

Besides, when the driving state is varied from the low compression ratio driving region or the intermediate compression ratio driving region to the high compression ratio driving region, the compression ratio is maintained to the low compression ratio or the intermediate compression ratio in the region which is sandwiched by the characteristic line A and the characteristic line B in FIG. 3. That is, even when the driving state is varied from the right side region of the characteristic line A to the left side region of the characteristic line A in FIG. 3, the compression ratio is maintained to the low compression ratio or the intermediate compression ratio until the lock-up mechanism of the torque converter 2 is switched from the lock-up ON state to the lock-up OFF state.

Moreover, FIG. 3 shows a part of the region in which the compression ratio varying control of the internal combustion engine 1 and the lock-up mechanism switching control of the torque converter 2 are cooperated. It is possible to set the compression ratio to the low compression ratio on the high load side (not shown) for avoiding the knocking and so on, irrespective of the state of the lock-up mechanism of the torque converter 2. It is deviated from the frequency region in which the booming noise (the vehicle vibration) is generated as the engine speed becomes higher. Accordingly, it is possible to set the compression ratio to the high compression ratio in the lock-up ON state, on the high speed side (not shown) on which the influence on the booming noise (the vehicle vibration) is sufficiently small.

Figure 4:
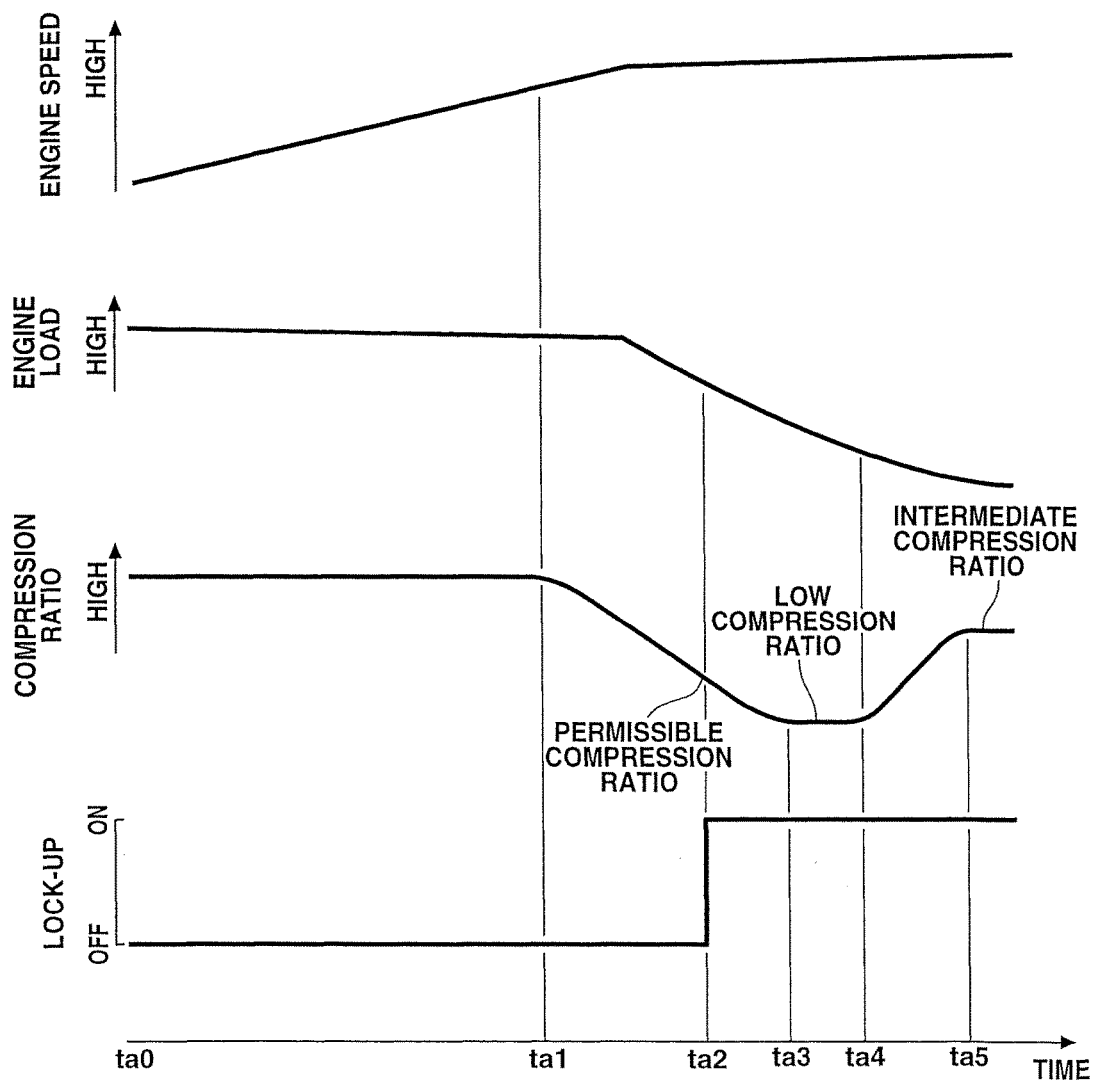
FIG. 4 is a timing chart showing one example of a driving state in one or more embodiments of present invention.

FIG. 4 is a timing chart showing one example of the driving state in which the engine speed is increased at the substantially constant engine load, and then the engine load is decreased in accordance with the increase of the engine speed. Besides, the timing chart shown in FIG. 4 corresponds to the driving state shown by an arrow D1 in FIG. 3.

At time ta0, the compression ratio is the high compression ratio, and the lock-up mechanism of the torque converter 2 is the lock-up OFF state. At time ta1, the driving state enters the low compression ratio driving region and the lock-up ON region. At time ta1, the compression ratio is switched from the high compression ratio to the low compression ratio. However, the lock-up OFF state is maintained since the decrease of the compression ratio is delayed due to the response delay. At time ta2, the compression ratio becomes equal to or smaller than the permissible compression ratio. The lock-up mechanism of the torque converter 2 is switched from the lock-up OFF state to the lock-up ON state. At time Ta3, the compression ratio reaches the low compression ratio. At time ta4, the engine load is decreased, and the driving state enters the above-described intermediate compression ratio driving region. Accordingly, the compression ratio is switched from the low compression ratio to the intermediate compression ratio. At time ta5, the compression ratio reaches the intermediate compression ratio.

Figure 5:
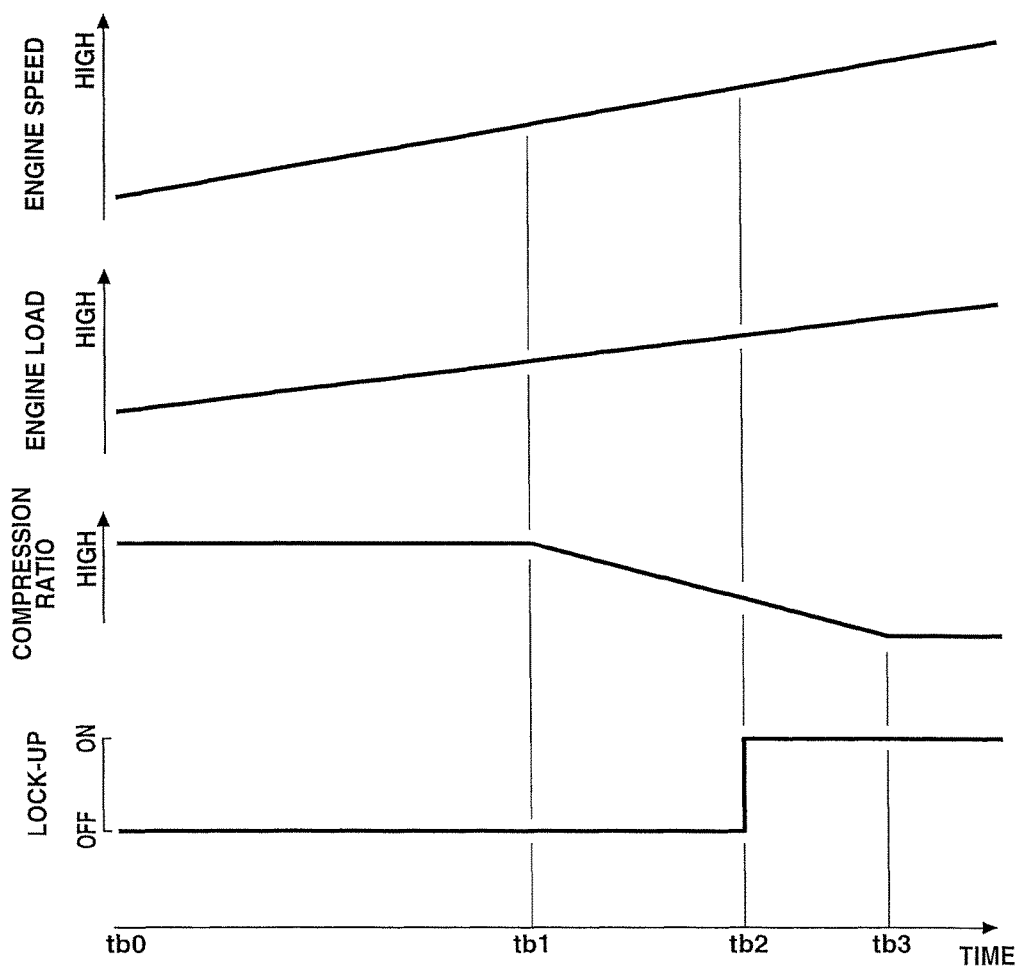
FIG. 5 is a timing chart showing one example of a driving state in one or more embodiments of present invention.

FIG. 5 is a timing chart showing one example of the driving state in which both of the engine load and the engine speed are increased. Besides, the timing chart shown in FIG. 5 corresponds to the driving state shown by an arrow D2 in FIG. 3.

At time tb0, the compression ratio is the high compression ratio, and the lock-up mechanism of the torque converter 2 is in the lock-up OFF state. At time tb1, the driving state enters the low compression ratio driving region and the lock-up ON region. At time tb1, the compression ratio is switched from the high compression ratio to the low compression ratio. However, the decrease of the compression ratio is delayed due to the response delay. Accordingly, the lock-up OFF state is maintained. Time tb2 is a timing at which the driving state exceeds the forcible lock-up ON line due to the further increases of the engine load and the engine speed. Accordingly, at time tb2, the lock-up mechanism of the torque converter 2 is switched from the lock-up OFF state to the lock-up ON state although the compression ratio is not equal to or smaller than the permissible compression ratio. At time tb3, the compression ratio reaches the low compression ratio.

Figure 6:
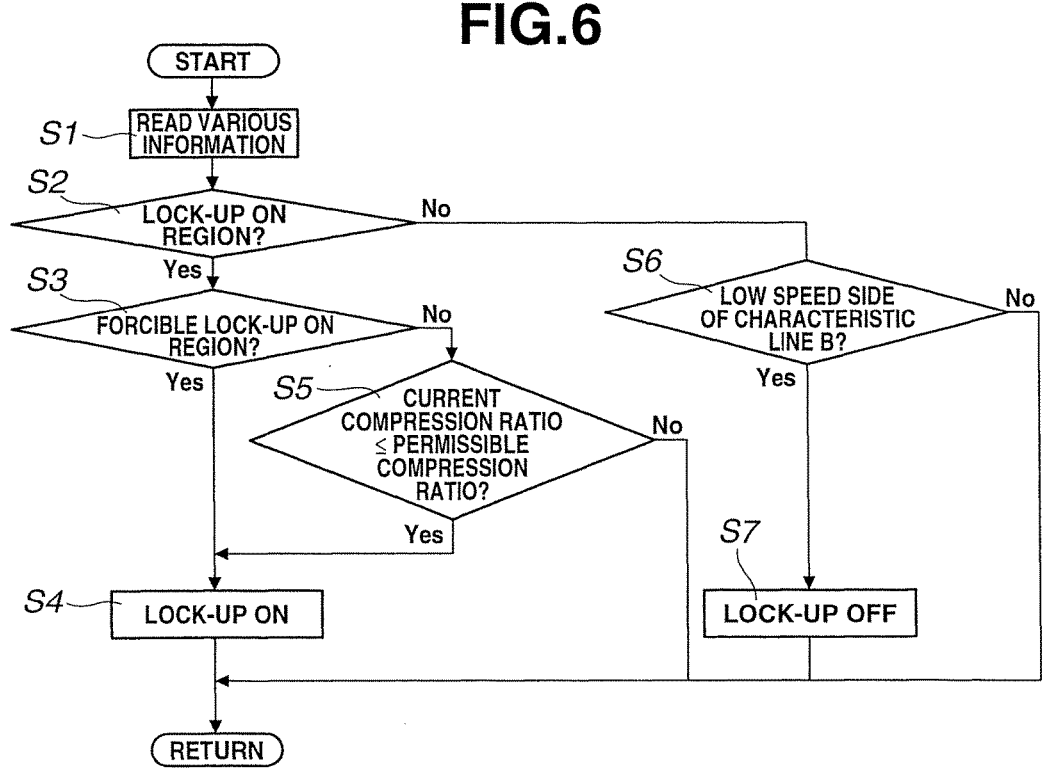
FIG. 6 is a flowchart showing a flow of the control in one or more embodiments of present invention.

FIG. 6 is a flowchart showing a flow of a control according to one or more embodiments of present invention. At S1, the various information such as the engine speed, the engine load, and the current compression ratio are read. At S2, it is judged whether or not the current driving state is in the lock-up ON region. When the current driving state is in the lock-up ON region, the process proceeds to S3. When the current driving state is not in the lock-up ON region, the process proceeds to step S6. At S3, it is judged whether or not the current driving state is in the forcible lock-up ON region. When the current driving state is in the forcible lock-up ON region, the process proceeds to S4. When the current driving state is not in the forcible lock-up ON region, the process proceeds to S5. At S4, the lock-up mechanism of the torque converter 2 is switched to the lock-up ON state when the lock-up mechanism is in the lock-up OFF state. When the lock-up mechanism is in the lock-up ON state, that state is maintained (continued). At S5, when the current compression ratio is equal to or smaller than the permissible compression ratio, the process proceeds to S4. At S5, when the current compression ratio is greater than the permissible compression ratio, the current state of the lock-up mechanism of the torque converter 2 is maintained, and the this routine is finished. At S6, it is judged whether or not the current driving state is in the lock-up OFF region on the low speed side of the characteristic line B. When the current driving state is in the lock-up OFF region on the low speed side of the characteristic line B, the process proceeds to S7. At S6, when the current driving state is not in the lock-up OFF region on the low speed side of the characteristic line B, the lock-up mechanism of the torque converter 2 is maintained to the current state, and this routine is finished. At S7, when the lock-up mechanism of the torque converter 2 is in the lock-up ON state, the lock-up mechanism of the torque converter 2 is switched to the lock-up OFF state. When the lock-up mechanism is the lock-up OFF state, that state is maintained (continued).

Next, additional embodiments of the present invention is illustrated. Besides, the same symbols are attached to constituting elements which are similar to the constituting elements in the above-described embodiments. Repetitive illustrations are omitted.

The below embodiments have a configuration which is substantially similar to that of the above-described embodiments. The compression ratio varying control of the internal combustion engine 1 and the lock-up mechanism switching control of the torque converter 2 are performed so as to decrease the step (the variation width) of the compression ratio when the lock-up mechanism of the torque converter 2 is switched from the lock-up OFF state to the lock-up ON state, in consideration of the response delay of the compression ratio in the compression ratio varying control.

Figure 7:
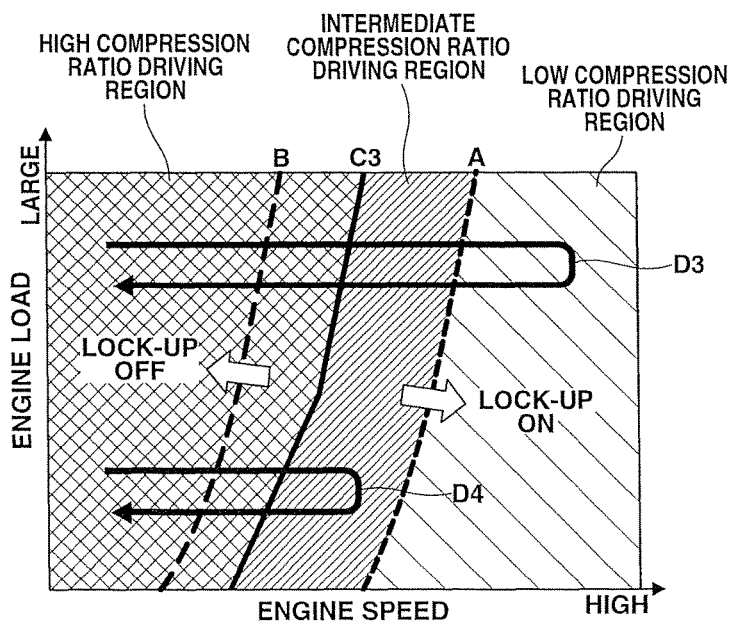
FIG. 7 is an explanation view schematically showing a setting region of a compression ratio, and a state of a lock-up mechanism in one or more embodiments of present invention.

FIG. 7 is an explanation view schematically showing a setting region of the compression ratio and the state of the lock-up mechanism of the torque converter 2 in one or more embodiments of the present invention.

A characteristic line A shown by a broken line in FIG. 7 is a lock-up ON line. As shown by an arrow in FIG. 7, when the driving state is varied in FIG. 7 from a left side region of the characteristic line A to a right side region of the characteristic line A, the lock-up mechanism of the torque converter 2 is switched from the lock-up OFF state to the lock-up ON state. That is, the high speed side of the characteristic line A, that is, the right side region of the characteristic line A in FIG. 7 is the lock-up ON region in which the lock-up mechanism of the torque converter 2 is brought to the lock-up ON state. The low speed side of the characteristic line A, that is, the left side region of the characteristic line A in FIG. 7 is the lock-up OFF region in which the lock-up mechanism of the torque converter 2 is brought to the lock-up OFF state. In FIG. 7, a case where the driving state is varied from the left side region of the characteristic line A to the right side region of the characteristic line A is, for example, a case where the only engine load is decreased, a case where the engine load is suddenly decreased and the engine speed is decreased by the small amount, a case where the engine load is decreased by the small amount and the engine speed is suddenly increased, and so on.

A characteristic line B shown by a broken line in FIG. 7 is the lock-up OFF line which is positioned on the low speed side of the characteristic line A. When the lock-up mechanism of the torque converter 2 is in the lock-up ON state, the lock-up mechanism is switched to the lock-up OFF state when the driving state is varied in FIG. 7 from the right side region of the characteristic line B to the left side region of the characteristic line B as shown by an arrow in FIG. 7. That is, the lock-up ON state is maintained in a region sandwiched by the characteristic line A and the characteristic line B. That is, the region sandwiched by the characteristic line A and the characteristic line B in FIG. 7 is a hysteresis when the lock-up mechanism of the torque converter 2 is switched.

In FIG. 7, a region on the high speed side of the characteristic line A, that is, the right side region of the characteristic line A is the low compression ratio driving region in which the compression ratio of the internal combustion engine 1 is set to the predetermined low compression ratio.

In FIG. 7, a region on the low speed side of the characteristic line A, that is, the left side region of the characteristic line A is divided to left and right regions by a characteristic line C3 shown by a solid line in FIG. 7. A region which is on the left side of the characteristic line C3 in FIG. 7, and which is on the relatively low speed side is the high compression ratio driving region in which the compression ratio is set to the predetermined high compression ratio. A region which is on the right side of the characteristic line C3 in FIG. 7, and which is on the relatively high speed side is a region in which the compression ratio of the internal combustion engine 1 is set to an intermediate compression ratio driving region in which the compression ratio of the internal combustion engine 1 is set to a predetermined intermediate compression ratio that is lower than the predetermined high compression ratio, and that is greater than the predetermined low compression ratio. That is, the intermediate compression ratio driving ratio region in one or more embodiments of present invention is a region sandwiched by the characteristic line A and the characteristic line C3 in FIG. 7. The high compression ratio driving region is the region which is positioned on the left side of the characteristic line C3 in FIG. 7, and which includes the characteristic line B. That is, the intermediate compression ratio driving region in one or more embodiments of present invention is set between the high compression ratio driving region and the low compression ratio driving region so that the high compression ratio driving region and the low compression ratio driving region are not adjacent to each other. That is, when the driving state is shifted from the high compression ratio driving region to the low compression ratio driving ratio, the driving state inevitably (constantly) passes through the intermediate compression ratio driving region.

In this case, the high compression ratio driving region in one or more embodiments of present invention corresponds to a first driving region in which the lock-up mechanism is brought to the lock-up OFF state at the high compression ratio. The low compression ratio driving region in one or more embodiments of present invention corresponds to a second driving region in which the lock-up mechanism is brought to the lock-up ON state at the low compression ratio. The intermediate compression ratio driving region in one or more embodiments of present invention corresponds to a third driving region in which the lock-up mechanism is brought to the lock-up OFF state at the intermediate compression ratio.

Besides, when the driving state is varied from the low compression ratio driving region to the intermediate compression ratio driving region or the high compression ratio driving region, the compression ratio is maintained to the low compression ratio in the region sandwiched by the characteristic line A and the characteristic line B in FIG. 7. That is, even when the driving state is varied in FIG. 7 from the right side region of the characteristic line A to the left side region of the characteristic line A, the compression ratio is maintained to the low compression ratio until the lock-up mechanism of the torque converter 2 is switched from the lock-up ON state to the lock-up OFF state.

Moreover, FIG. 7 shows a part of a region in which the compression ratio varying control of the internal combustion engine 1 and the lock-up mechanism switching control of the torque converter 2 are cooperated. The compression ratio may be the low compression ratio on the high load side (not shown) for avoiding the knocking and so on, irrespective of the state of the lock-up mechanism of the torque converter. The frequency is deviated from the frequency region in which the booming noise (the vehicle vibration) is generated as the engine speed becomes higher. Accordingly, the compression ratio may be set to the high compression ratio in the lock-up ON state, on the high speed side (not shown) on which the influence on the booming noise (the vehicle vibration) is sufficiently small.

In one or more embodiments of present invention, when the driving state of the internal combustion engine 1 is shifted from the high compression ratio driving region to the low compression ratio driving region, the driving state passes through the intermediate compression ratio driving region in which the lock-up mechanism becomes the lock-up OFF state. That is, it is possible to shift the compression ratio to the low compression ratio side before the lock-up mechanism is switched from the lock-up OFF state to the lock-up ON state. Accordingly, it is possible to decrease the step of the compression ratio when the lock-up mechanism of the torque converter 2 is switched from the lock-up OFF state to the lock-up ON state, and to decrease the vehicle vibration (the booming noise) due to the response delay of the compression ratio.

Furthermore, the lock-up mechanism of the torque converter 2 is not in the lock-up ON state in the high compression ratio state. Consequently, it is possible to suppress the generation of the vehicle vibration (the booming noise).

In one or more embodiments of present invention, the switching from the lock-up OFF state to the lock-up ON state is performed at a timing at which the driving state is shifted from the intermediate compression ratio driving region to the low compression ratio driving region. The switching from the lock-up ON state to the lock-up OFF state is performed within the high compression ratio driving region. When the driving state is shifted from the low compression ratio driving region to the intermediate compression ratio driving region in the lock-up ON state, the compression ratio is maintained to the low compression ratio. When the driving state is shifted from the intermediate compression ratio driving region to the high compression ratio driving region in the lock-up ON state, the compression ratio is maintained to the low compression ratio. The compression ratio is switched from the low compression ratio to the high compression ratio at a timing at which the lock-up mechanism is switched from the lock-up ON state to the lock-up OFF state.

Therefore, it is possible to decrease the vehicle vibration (the booming noise), relative to a case where the compression ratio is switched from the low compression ratio to the intermediate compression ratio in the lock-up ON state when the driving state of the internal combustion engine 1 is shifted from the low compression ratio driving region to the intermediate compression ratio driving region.

Furthermore, in one or more embodiments of present invention, in a case where the driving state in the high compression ratio driving region and in the lock-up OFF region is continued during the predetermined time period, the compression ratio is maintained to the high compression ratio even when the driving state is shifted from the high compression ratio driving region to the intermediate compression ratio driving region.

That is, in a case where the vehicle travels on the traffic congestion road, the control unit 6 estimates the time period for the vehicle to pass through the traffic congestion, based on information from the car navigation system 9 mounted on the vehicle, and so on. In a case where the travel on the congestion road is continued during a predetermined time period from the estimated congestion road traveling estimation time period, the compression ratio is maintained to the high compression ratio even when the driving state is shifted from the high compression ratio driving region to the intermediate compression ratio driving region.

In a case where the vehicle travels on the congestion road during the long time period, the internal combustion engine 1 is basically driven in the high compression ratio driving region since the internal combustion engine 1 is mainly driven at the low load and the low speed. Accordingly, even when the internal combustion engine 1 is driven in the intermediate compression ratio driving region, it is the temporal driving.

Therefore, when it is predicted that the vehicle is driven in the high compression ratio driving region and in the lock-up OFF region during the long time period, like in the congestion, the compression ratio is maintained to the high compression ratio since the driving state is immediately returned to the high compression ratio driving region even when the driving state becomes the intermediate compression ratio region. With this, it is possible to relatively improve the fuel economy.

FIG. 8 is a timing chart showing one example of the driving state in which the engine speed is increased at the substantially constant load, and then the engine speed is decreased at the substantially constant load. Besides, the timing chart shown in FIG. 8 corresponds to the driving state shown in an arrow D3 in FIG. 7.

At time tc0, the compression ratio is the high compression ratio, and the lock-up mechanism of the torque converter 2 is the lock-up OFF state. At time tc1, the driving state enters the intermediate compression ratio driving region from the high compression ratio driving region, and the compression ratio is switched from the high compression ratio to the intermediate compression ratio. At time tc2, the driving state enters the low compression ratio driving region and the lock-up ON region, the compression ratio is switched from the intermediate compression ratio to the low compression ratio, and the lock-up mechanism of the torque converter 2 is switched from the lock-up OFF state to the lock-up ON state. At time tc3, the driving state enters the intermediate compression ratio driving region from the low compression ratio and lock-up ON region. However, the lock-up mechanism of the torque converter 2 is in the lock-up ON state. Accordingly, the compression ratio is not switched, and the compression ratio is maintained to the low compression ratio. At time tc4, the driving state enters the high compression ratio driving region from the intermediate compression ratio driving region. However, the lock-up mechanism of the torque converter 2 is in the lock-up ON state. Accordingly, the compression ratio is not switched, and the compression ratio is maintained to the low compression ratio. Time tc5 is a timing at which the driving state is shifted from the high speed side of the characteristic line B to the low speed side of the characteristic line B. Therefore, at time tc5, the compression ratio is switched from the low compression ratio to the high compression ratio, and the lock-up mechanism of the torque converter 2 is switched from the lock-up ON state to the lock-up OFF state.

FIG. 9 is a time chart showing one example of the driving state when it is estimated that the vehicle travels on the congestion road during the long time period. Besides, the time chart shown in FIG. 9 corresponds to a driving state shown by an arrow D4 of FIG. 7.

At time td0, the compression ratio is the high compression ratio, and the lock-up mechanism of the torque converter 2 is in the lock-up OFF state. At time td1, the driving state enters the intermediate compression ratio driving region from the high compression ratio driving region. However, it is estimated (presumed) that the vehicle travels on the congestion road during the long time period. Accordingly, the compression ratio is not switched, and the compression ratio is maintained to the high compression ratio. Besides, in a case where the vehicle does not travel on the congestion road, the compression ratio is switched from the high compression ratio to the intermediate compression ratio at time td1, as shown by a broken line in FIG. 9. Then, the compression ratio is switched from the intermediate compression ratio to the high compression ratio at time td2 at which the engine speed is decreased and the driving state enters the high compression ratio driving region from the intermediate compression ratio driving region.

Figure 10:
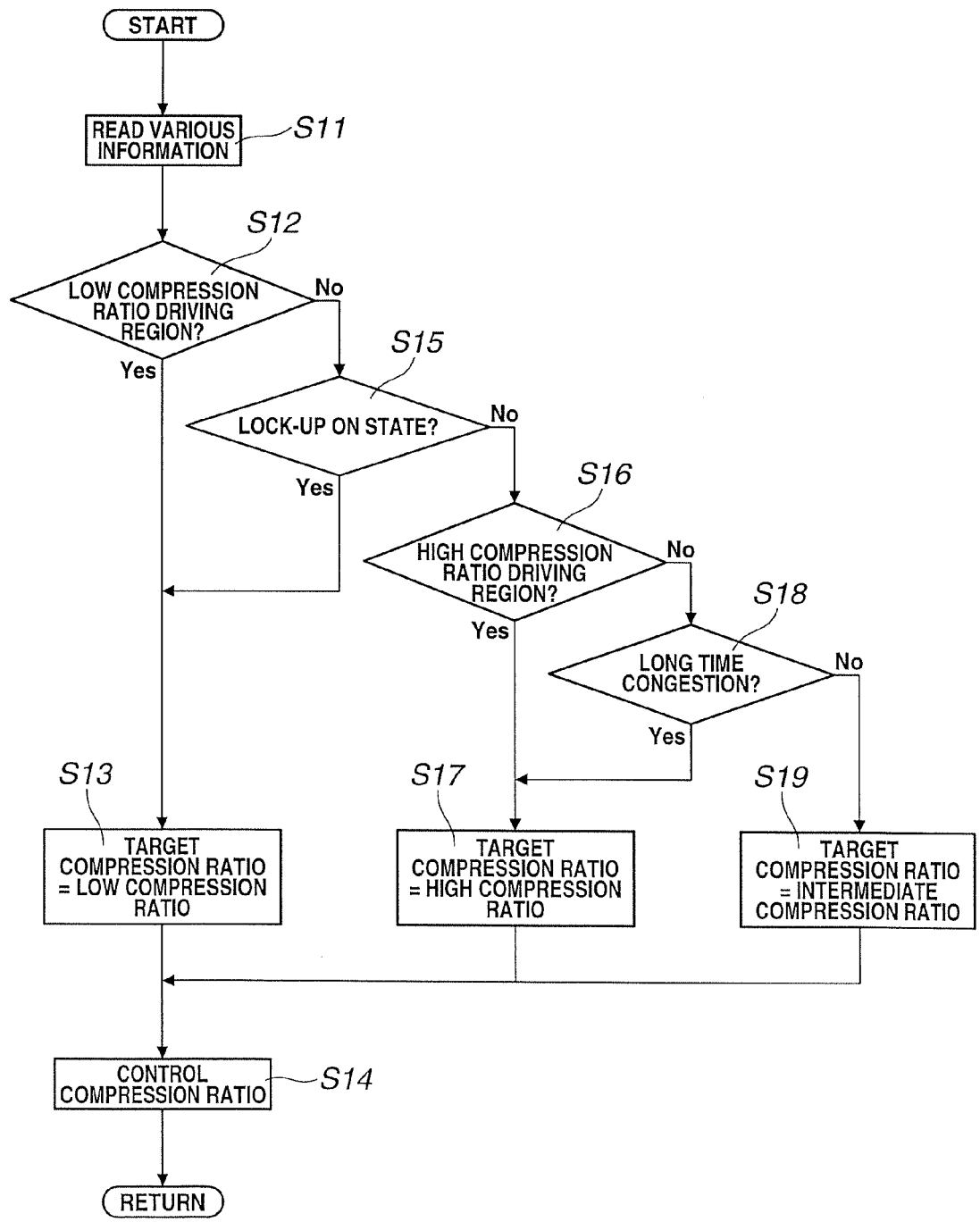
FIG. 10 is a flowchart showing a flow of the control in one or more embodiments of present invention.

FIG. 10 is a flowchart showing a flow of the control in one or more embodiments of present invention. At S11, the various information such as the engine speed, the engine load, the state of the lock-up mechanism of the torque converter 2 (whether the lock-up mechanism is in the lock-up ON state or in the lock-up OFF state), the current compression ratio, and the congestion road traveling estimation time period are read. In this case, the congestion road traveling estimation time period is, for example, an estimated value of the time period necessary for the vehicle to finish to pass through the congestion road. When the vehicle does not travel on the congestion road, the congestion road traveling estimation time period is "0". At S12, it is judged whether or not the current driving state is in the low compression ratio driving region. When the current driving state is in the low compression ratio driving region, the process proceeds to S13. When the current driving state is not in the low compression ratio driving region, the process proceeds to S15. At S13, the target compression ratio is set to the low compression ratio. At S14, the compression ratio is controlled to become the set target compression ratio. At S15, it is judged whether or not the lock-up mechanism is in the lock-up ON state. When the lock-up mechanism is in the lock-up ON state, the process proceeds to S13. When the lock-up mechanism is not in the lock-up ON state, the process proceeds to S16. At S16, it is judged whether or not the current driving state is in the high compression ratio driving region. When the lock-up mechanism is in the high compression ratio driving region, the process proceeds to S17. When the lock-up mechanism is not in the high compression ratio driving region, the process proceeds to S18. At S17, the target compression ratio is set to the high compression ratio. At S18, it is judged whether or not the vehicle is during the long time period congestion. That is, it is judged whether or not the congestion road traveling estimation time period is equal to or greater than the predetermined threshold value. When the congestion road traveling estimation time period is equal to or greater than the predetermined threshold value, the process proceeds to S17. When the congestion road traveling estimation time period is not equal to or greater than the predetermined threshold value, the process proceeds to S19. At S19, the target compression ratio is set to the intermediate compression ratio.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control device for a vehicle including a variable compression ratio mechanism arranged to vary an engine compression ratio of an internal combustion engine, and a torque converter which includes a lock-up mechanism, and which is disposed between the internal combustion engine and a transmission, the control device comprising:

a controller configured to switch the engine compression ratio from a high compression ratio to a low compression ratio, and to switch the lock-up mechanism from a lock-up OFF state to a lock-up ON state, wherein, when the controller is switching the engine compression ratio from the high compression ratio to the low compression ratio, the controller starts switching the lock-up mechanism to the lock-up ON state when a current engine compression ratio is equal to or smaller than a permissible compression ratio which is between the high compression ratio and the low compression ratio.

2. The control device for the vehicle as claimed in claim 1, wherein the permissible compression ratio is decreased as a load of the internal combustion becomes higher.

3. The control device for the vehicle as claimed in claim 1, wherein the permissible compression ratio is increased as an engine speed of the internal combustion engine becomes higher.

4. The control device for the vehicle as claimed in claim 1, wherein the controller starts switching the lock-up mechanism from the lock-up OFF state to the lock-up ON state without waiting for the shift of the current engine compression ratio to a value equal to or smaller than the permissible compression ratio, when a driving state of the internal combustion engine is in a predetermined high load and high speed region.

5. A control device for a vehicle including a variable compression ratio mechanism arranged to vary an engine compression ratio of an internal combustion engine between a high compression ratio, a low compression ratio, and an intermediate compression ratio between the high compression ratio and the low compression ratio, and a torque converter which includes a lock-up mechanism, and which is disposed between the internal combustion engine and a transmission, the control device comprising:
a controller configured to switch the lock-up mechanism between a lock-up OFF state to a lock-up ON state based on a map comprising:
a first driving region in which the lock-up mechanism is brought to the lock-up OFF state at the high compression ratio,
a second driving region in which the lock-up mechanism is brought to the lock-up ON state at the low compression ratio, and
a third driving region which is positioned between the first driving region and the second driving region, and in which the lock-up mechanism is brought to the lock-up OFF state at the intermediate compression ratio,
wherein the first to third driving regions are defined by a rotation speed of the internal combustion engine and an engine load of the internal combustion engine.

6. The control device for the vehicle as claimed in claim 5,
wherein the switching from the lock-up OFF state to the lock-up ON state is performed at a timing of a shift from the third driving region to the second driving region,
wherein the switching from the lock-up ON state to the lock-up OFF state is performed within the first driving region, and
wherein the engine compression ratio is maintained to the low compression ratio when a driving state of the internal combustion engine is shifted from the second driving state to the third driving state.

7. The control device for the vehicle as claimed in claim 5,
wherein the control device includes a high compression ratio lock-up OFF driving time period estimating section configured to estimate a driving time period at the high compression ratio in the lock-up OFF state; and
wherein, when the driving continuation time period estimated in the high compression ratio lock-up OFF driving time period estimating section becomes equal to or greater than a predetermined time period, the engine compression ratio is maintained to the high compression ratio even when the driving state is shifted from the first driving region to the third driving region.

* * * * *